United States Patent
Yll et al.

(10) Patent No.: US 9,478,029 B2
(45) Date of Patent: Oct. 25, 2016

(54) SELECTION STRATEGY FOR EXCHANGING MAP INFORMATION IN COLLABORATIVE MULTI-USER SLAM SYSTEMS

(71) Applicant: QUALCOMM Incorporated, San Diego, CA (US)

(72) Inventors: Winston Yll, Melbourne (AU); Gerhard Reitmayr, Vienna (AT); Peter H. Rauber, Vienna (AT); Qi Pan, Vienna (AT); Zsolt Szalavari, Vienna (AT); Michael Gervautz, Vienna (AT)

(73) Assignee: QUALCOMM Incorporated, San Diego, CA (US)

( * ) Notice: Subject to any disclaimer, the term of this patent is extended or adjusted under 35 U.S.C. 154(b) by 15 days.

(21) Appl. No.: 14/522,233

(22) Filed: Oct. 23, 2014

(65) Prior Publication Data

US 2016/0117822 A1   Apr. 28, 2016

(51) Int. Cl.
*G06K 9/00* (2006.01)
*G06T 7/00* (2006.01)

(52) U.S. Cl.
CPC .......... *G06T 7/0038* (2013.01); *G06T 7/0034* (2013.01); *G06T 7/0048* (2013.01); *G06T 7/0065* (2013.01); *G06T 2207/10016* (2013.01); *G06T 2207/20076* (2013.01); *G06T 2207/30241* (2013.01); *G06T 2207/30244* (2013.01)

(58) Field of Classification Search
None
See application file for complete search history.

(56) References Cited

U.S. PATENT DOCUMENTS

| | | | |
|---|---|---|---|
| 8,649,565 B1* | 2/2014 | Kim | G06K 9/00369 382/106 |
| 2004/0167667 A1* | 8/2004 | Goncalves | G01C 21/12 700/245 |
| 2012/0121161 A1 | 5/2012 | Eade et al. | |
| 2012/0197464 A1 | 8/2012 | Wang et al. | |
| 2013/0010068 A1 | 1/2013 | Tiernan et al. | |
| 2013/0215230 A1 | 8/2013 | Miesnieks et al. | |
| 2014/0119598 A1* | 5/2014 | Ramachandran | G06T 7/0071 382/103 |
| 2014/0279860 A1* | 9/2014 | Pan | G06F 17/3087 707/609 |
| 2014/0315570 A1* | 10/2014 | Yun | H04W 4/043 455/456.1 |
| 2014/0323148 A1* | 10/2014 | Schmalstieg | G01C 21/005 455/456.1 |
| 2015/0304634 A1* | 10/2015 | Karvounis | H04N 13/0239 348/46 |

FOREIGN PATENT DOCUMENTS

WO   2014020317 A1   2/2014

OTHER PUBLICATIONS

M. J. Milford, G. Wyeth, and D. Prasser, "Simultaneous Localization and Mapping from Natural Landmarks using RatSLAM," Australasian Conference on Robotics and Automation, 2004.*

(Continued)

*Primary Examiner* — Andrae S Allison
(74) *Attorney, Agent, or Firm* — Blakely Sokoloff Taylor & Zafmann (57) ABSTRACT

Disclosed is a method and apparatus for selecting a part of SLAM map information of a first device for transmission to a second device in a collaborative SLAM environment. In one embodiment, the functions implemented include: determining whether a 3D registration transformation between a map of the first device and a map of the second device is available; and transmitting a part of map information of the first device to the second device according to one of a first strategy or a second strategy based on whether or not a 3D registration transformation between the map of the first device and the map of the second device is available.

20 Claims, 4 Drawing Sheets

(56) References Cited

OTHER PUBLICATIONS

Tully, S., Kantor, G., Choset, H.: A unified bayesian framework for global localization and slam in hybrid metric/topological maps. Int. J. Rob. Res. 31(3), 271-288 (2012).*

Forster C, "Collaborative Structure from Motion", Aug. 1, 2012, pp. i-v, 1-58, XP055096972, Retrieved from the Internet URL:http://students.asl.ethz.chjupl_pdf/359-report.pdf.

International Search Report and Written Opinion—PCT/US2015/055008—ISA/EPO—Jan. 20, 2016.

Lazaro M.T., et al., "Multi-Robot Slam Using Condensed Measurements", 2013 IEEE/RSJ International Conference on Intelligent Robots and Systems, IEEE, Nov. 3, 2013, pp. 1069-1076, XP032537752, ISSN: 2153-0858, DOI: 10.1109/IROS2013.6696483 [retrieved on Dec. 26, 2013].

* cited by examiner

SELECTION STRATEGY FOR EXCHANGING MAP INFORMATION IN COLLABORATIVE MULTI-USER SLAM SYSTEMS

FIELD

Embodiments of the invention relate generally to visual odometry. In particular, embodiments of the invention relate to information exchange in a collaborative simultaneous localization and mapping (SLAM) system.

BACKGROUND

The simultaneous localization and mapping (SLAM) technique enables a camera-equipped device to quickly capture a 3D model of the environment (i.e., mapping) while simultaneously tracking and obtaining six degrees-of-freedom (6DoF) pose information of the camera. Both mapping and pose tracking may be used in such applications as games, interactive visualizations and advertising applications.

Multiple camera-equipped devices performing SLAM-based mapping and pose tracking may be networked so that they may exchange map and pose information. Such devices may be, for example, camera-equipped mobile devices with wireless communication capabilities. By computing 3D transformations between the maps, maps of different devices may be correlated and combined to form a larger, shared map. Therefore, by taking advantage of the shared map and thereby reducing repetitive work, overhead in mapping may be reduced.

Map and pose information sharing may also enable or enhance such applications as multi-user gaming, multi-user design sessions, social augmented reality (for example, a user may leave messages or other content in an environment for other users retrieve), and indoor navigation, etc.

Exchanging all the map information among the devices at once may be unnecessary and may consume too many resources in terms of transmission bandwidth and transmission time because not all the map information is equally potentially useful in a given scenario and the total amount of map information may be relatively large.

SUMMARY

An embodiment disclosed herein may include a method for selecting a part of SLAM map information of a first device for transmission to a second device in a collaborative SLAM environment, comprising: determining whether a 3D registration transformation between a map of the first device and a map of the second device is available by matching the map of the first device against the map of the second device; in response to determining that a 3D registration transformation between a map of the first device and a map of the second device is not available, applying a first strategy for selecting a part of map information to be transmitted to the second device; and in response to determining that a 3D registration transformation between a map of the first device and a map of the second device is available, applying a second strategy for selecting a part of map information to be transmitted to the second device, the second strategy being different from the first strategy.

Another embodiment disclosed herein may include a first device apparatus for selecting a part of SLAM map information of the first device for transmission to a second device in a collaborative SLAM environment, comprising: a memory; and a processor to: determine whether a 3D registration transformation between a map of the first device and a map of the second device is available by matching the map of the first device against the map of the second device, in response to determining that a 3D registration transformation between a map of the first device and a map of the second device is not available, apply a first strategy for selecting a part of map information to be transmitted to the second device, and in response to determining that a 3D registration transformation between a map of the first device and a map of the second device is available, apply a second strategy for selecting a part of map information to be transmitted to the second device, the second strategy being different from the first strategy.

A further embodiment disclosed herein may include a first device apparatus for selecting a part of SLAM map information of the first device for transmission to a second device in a collaborative SLAM environment, comprising: means for determining whether a 3D registration transformation between a map of the first device and a map of the second device is available; means for in response to determining that a 3D registration transformation between a map of the first device and a map of the second device is not available by matching the map of the first device against the map of the second device, applying a first strategy for selecting a part of map information to be transmitted to the second device; and means for in response to determining that a 3D registration transformation between a map of the first device and a map of the second device is available, applying a second strategy for selecting a part of map information to be transmitted to the second device, the second strategy being different from the first strategy.

An additional embodiment disclosed herein may include a non-transitory computer-readable medium including code which, when executed by a processor, causes the processor to perform a method comprising: determining whether a 3D registration transformation between a map of a first device and a map of a second device is available by matching the map of the first device against the map of the second device; in response to determining that a 3D registration transformation between a map of the first device and a map of the second device is not available, applying a first strategy for selecting a part of map information of the first device to be transmitted to the second device; and in response to determining that a 3D registration transformation between a map of the first device and a map of the second device is available, applying a second strategy for selecting a part of map information of the first device to be transmitted to the second device, the second strategy being different from the first strategy.

DETAILED DESCRIPTION

Figure 1:
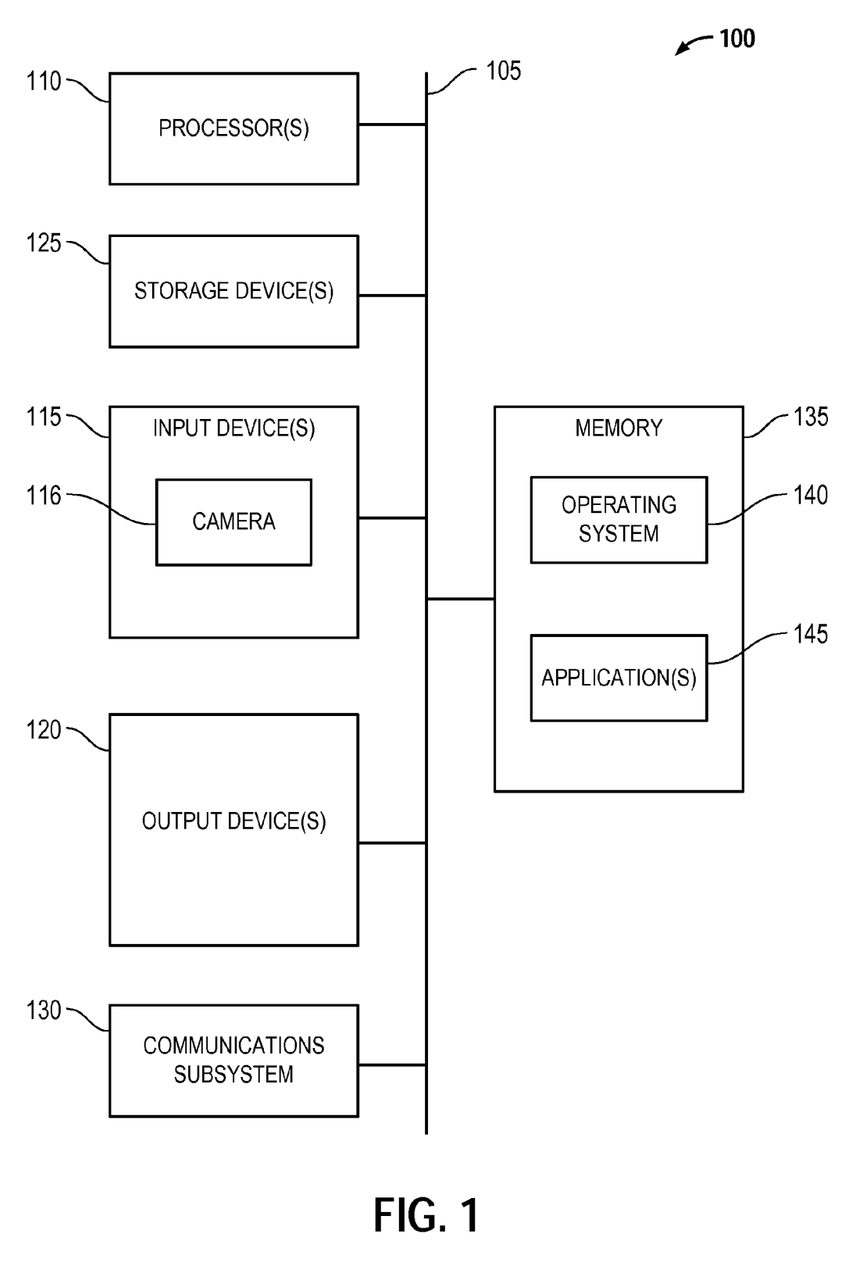
FIG. 1 illustrates an embodiment of a device adapted for collaborative SLAM operations.

An example device 100 adapted for collaborative SLAM operations is illustrated in FIG. 1. The device as used herein (such as device 100) may be a: mobile device, wireless device, cell phone, personal digital assistant, mobile computer, wearable device (e.g., watch, head mounted display, virtual reality glasses, etc.), tablet, personal computer, laptop computer, or any type of device that has processing capabilities. As used herein, a mobile device may be any portable, or movable device or machine that is configurable to acquire wireless signals transmitted from, and transmit wireless signals to, one or more wireless communication devices or networks. Thus, by way of example but not limitation, the device 100 may include a radio device, a cellular telephone device, a computing device, a personal communication system device, or other like movable wireless communication equipped device, appliance, or machine.

The device 100 is shown comprising hardware elements that can be electrically coupled via a bus 105 (or may otherwise be in communication, as appropriate). The hardware elements may include one or more processors 110, including without limitation one or more general-purpose processors and/or one or more special-purpose processors (such as digital signal processing chips, graphics acceleration processors, and/or the like); one or more input devices 115, which include without limitation a camera 116, a mouse, a keyboard, keypad, touch-screen, microphone and/or the like; and one or more output devices 120, which include without limitation a display device, a speaker, a printer, and/or the like.

The device 100 may further include (and/or be in communication with) one or more non-transitory storage devices 125, which can comprise, without limitation, local and/or network accessible storage, and/or can include, without limitation, a disk drive, a drive array, an optical storage device, solid-state storage device such as a random access memory ("RAM") and/or a read-only memory ("ROM"), which can be programmable, flash-updateable, and/or the like. Such storage devices may be configured to implement any appropriate data stores, including without limitation, various file systems, database structures, and/or the like.

The device may also include a communications subsystem 130, which can include without limitation a modem, a network card (wireless or wired), an infrared communication device, a wireless communication device and/or chipset (such as a Bluetooth device, an 802.11 device, a Wi-Fi device, a WiMAX device, a near field communication "NFC" device, cellular communication facilities, etc.), and/or the like. The communications subsystem 130 may permit data to be exchanged with a network, other devices, and/or any other devices described herein. In one embodiment, the device 100 may further comprise a memory 135, which can include a RAM or ROM device, as described above. It should be appreciated that device 100 may be a mobile device or a non-mobile device, and may have wireless and/or wired connections.

The device 100 may also comprise software elements, shown as being currently located within the working memory 135, including an operating system 140, device drivers, executable libraries, and/or other code, such as one or more application programs 145, which may comprise or may be designed to implement methods, and/or configure systems, provided by embodiments, as will be described herein. Merely by way of example, one or more procedures described with respect to the method(s) discussed below might be implemented as code and/or instructions executable by device 100 (and/or processor(s) 110 within device 100); in an aspect, then, such code and/or instructions can be used to configure and/or adapt a general purpose computer (or other device) to perform one or more operations in accordance with the described methods.

A set of these instructions and/or code might be stored on a non-transitory computer-readable storage medium, such as the storage device(s) 125 described above. In some cases, the storage medium might be incorporated within a device, such as the device 100. In other embodiments, the storage medium might be separate from a device (for example, a removable medium, such as a compact disc), and/or provided in an installation package, such that the storage medium can be used to program, configure, and/or adapt a general purpose computer with the instructions/code stored thereon. These instructions might take the form of executable code, which is executable by the computerized device 100 and/or might take the form of source and/or installable code, which, upon compilation and/or installation on the device 100 (e.g., using any of a variety of generally available compilers, installation programs, compression/decompression utilities, etc.), then takes the form of executable code.

Application programs 145 may include one or more applications for collaborative SLAM operations. An example application for collaborative SLAM operations is capable of quickly capturing a 3D model of the environment (i.e., mapping) while simultaneously tracking and obtaining six degrees-of-freedom (6DoF) pose information of the camera 116, as well as exchanging map and pose information with other devices. It should be appreciated that the functionality of the application for collaborative SLAM operations described hereinafter may be alternatively implemented in hardware or different levels of software, such as an operating system (OS), a firmware, a computer vision module, etc.

Embodiments of the invention are directed to a method for selecting a part of map information to be transmitted to another device in the same collaborative SLAM environment so that the part of map information that is more likely to be potentially relevant and useful in a given scenario has a higher probability of being transmitted.

A device 100 for selecting a part of SLAM map information of the device 100 for transmission to another device in a collaborative SLAM environment comprises a memory 135; and processor(s) 110 to: determine whether a 3D registration transformation between a map of the device 100 and a map of the other device, in response to determining that a 3D registration transformation between a map of the device 100 and a map of the other device is not available, apply a first strategy for selecting a part of map information to be transmitted to the other device, and in response to determining that a 3D registration transformation between a map of the device 100 and a map of the other device is available, apply a second strategy for selecting a part of map information to be transmitted to the other device, the second strategy being different from the first strategy.

Figure 2:
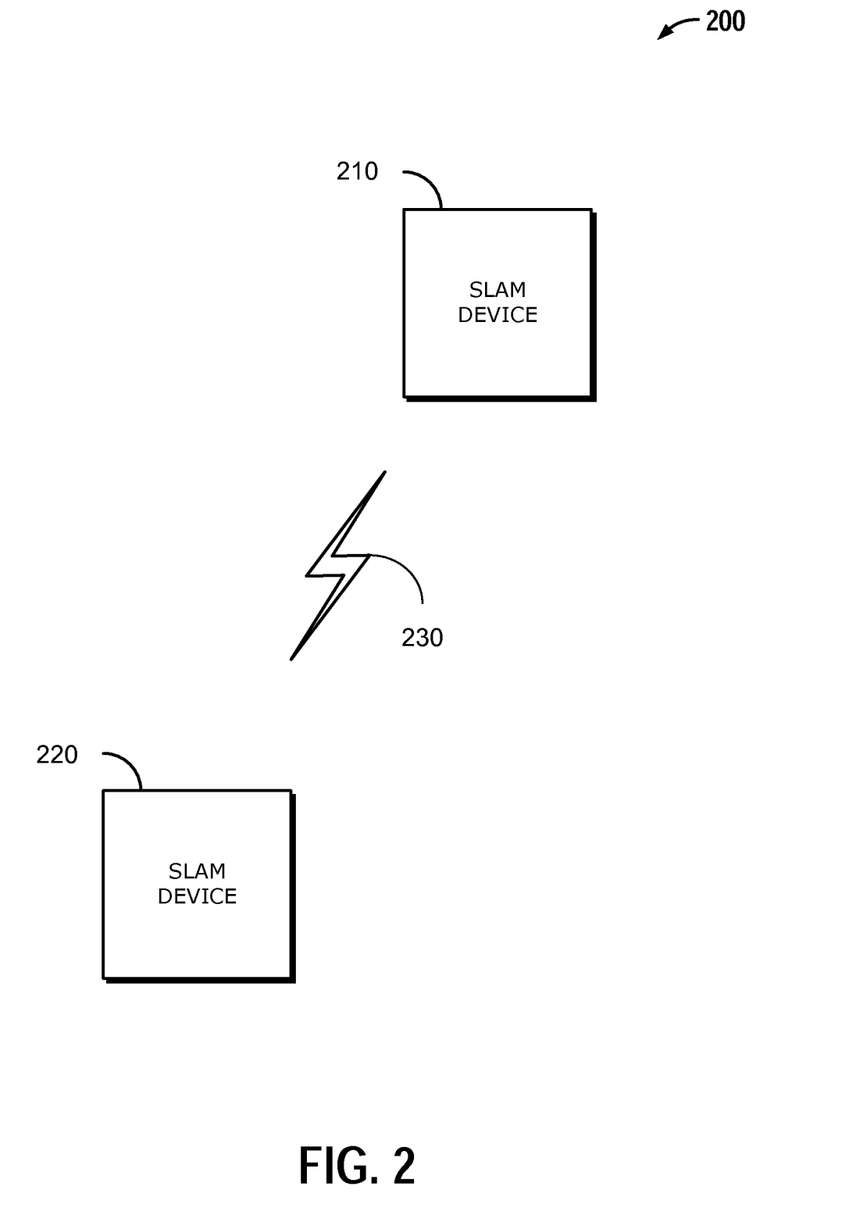
FIG. 2 illustrates an exemplary environment in which embodiments of the invention may be practiced.

Referring to FIG. 2, an illustration of an exemplary environment 200 in which embodiments of the invention may be practiced is shown. The two devices 210 and 220 shown may be camera-equipped devices, such as device 100, that are performing SLAM operations in a collaborative manner in the environment 200. More devices may be participating in the collaborative SLAM operations but are not shown in order not to obscure the description of the embodiments of the invention. A person of ordinary skill in the art should be able to infer the operations of the embodiments of the invention in which more than two devices are involved from the description hereinafter that sets forth the embodiments of the invention in which only the two devices 210 and 220 are involved. The number of devices performing collaborative SLAM operations in the environment 200 do not in any way limit the invention.

A communication link 230 between the device 210 and the device 220 enables the two devices 210 and 220 to communicate and exchange data including map and pose information with each other. The communication link 230 may take the form of any kind of communication medium, wired or wireless, as enabled by the communications subsystem 130 described above with respect to the device 100, although a wireless communication link is more convenient and therefore more likely. The communication link 230 may be a direct communication link between the device 210 and the device 220, or may be mediated by a server, a network device, etc. (not shown). Moreover, the memory of each of the devices 210 and 220 may store at least a SLAM map for the device, and may store the current and previous poses of the other device received from the other device through the communication link 230.

The description of the embodiments of the invention hereinafter utilizes the device 210 as an example of a device transmitting its map data to another device to assist the other device with SLAM operations, and utilizes the device 220 as an example of a device receiving map data from another device. However, it should be understood that the roles may be reversed as in a collaborative SLAM environment, each device may transmit map data to any of the other devices, and may receive map data from any of the other devices. It should also be understood that the embodiments of the invention described hereinafter may be adapted for a server device that stores a shared map and transmits map information to devices performing SLAM operations but does not perform SLAM operations itself. In other words, a map server not itself performing SLAM operations may utilize the embodiments of the invention described hereinafter to determine for each device which part of the shared map should be transmitted.

As is known by a person of ordinary skill in the art, a SLAM map may be represented as a set of keyframes and a set of 3D points, where a keyframe comprises a captured image and a pose of the camera associated with the image, and a 3D point is a 3D vector describing the location of a visual feature in the 3D environment. An observation of a 3D point in a keyframe is the measured 2D re-projection of the 3D point into the image of the keyframe. Knowing the relationships among keyframes, 3D points, and observations of 3D points allow computing a full SLAM map up to an unknown scale factor. This process may be referred to as a 3D registration transformation. Therefore, a device may incorporate map information received from another device into its own SLAM map when a 3D registration transformation between the maps is available.

Devices 210 and 220 may store the same scene in their respective maps with different keyframes and different 3D point estimates of the same visible surface. However, many 3D points in the two maps tend to coincide because they may have been generated with the same algorithm. Therefore, a 3D registration transformation between the two maps may be estimated using the common 3D points. That is, given two sets of 3D points where correspondence between points in the first set and the second set are known, a known algorithm may be used to estimate a uniform scale parameter, rotation matrix, and translation.

Because establishing a 3D registration transformation relies on the existence of a shared scene between two maps, the 3D registration transformation may not always be available between the maps of two devices. Generally speaking, a 3D transformation can be computed after either a set of 3D points from at least one keyframe or 2D observations from two keyframes have been matched between the two maps of the two devices. Therefore, different strategies for selecting the part of map information of the device 210 to be transmitted to device 220 may be required depending on whether a 3D registration transformation between maps of the devices 210 and 220 is available.

Embodiments of the invention assign a transmission probability distribution to the set of keyframes of the map of the device 210. For each keyframe in the set of keyframes, the transmission probability distribution may model the probability of selecting the keyframe for the next transmission to the device 220. Hereinafter, the set of keyframes comprising may be denoted $\{K_i\}$; the transmission probability distribution may be denoted P; and the individual probability of selecting the i-th keyframe $K_i$ for next transmission may be denoted $p_i$.

The default transmission probability distribution may be a uniform distribution. In other words, the initial value of $p_i$ for all i's may be $1/|\{K_i\}|$. The transmission probability may then be updated during collaborative SLAM operations based on new events or information through a Bayesian update step. Each update may be represented with a likelihood function that is multiplied point-wise with an old transmission probability distribution (the old transmission probability distribution may be denoted $P^-=\{p_i^-\}$). Therefore, the likelihood function changes how probable (or likely) each outcome of the probability distribution is. In other words, in some embodiments, different strategies for selecting a part of map information for transmission may correspond to different likelihood functions, and by specifying different likelihood functions how that probability is changed can be controlled. The likelihood function may be denoted $L=\{l_i\}$. The result of multiplying the old transmission probability distribution $P^-$ with the likelihood function L may be re-normalized to obtain a new transmission probability distribution P.

Therefore, the new transmission probability distribution P may be represented as $P=\{p_i\}$, where $$p_i = \frac{l_i * p_i^-}{\Sigma_j l_j * p_j^-}.$$

Figure 3A:
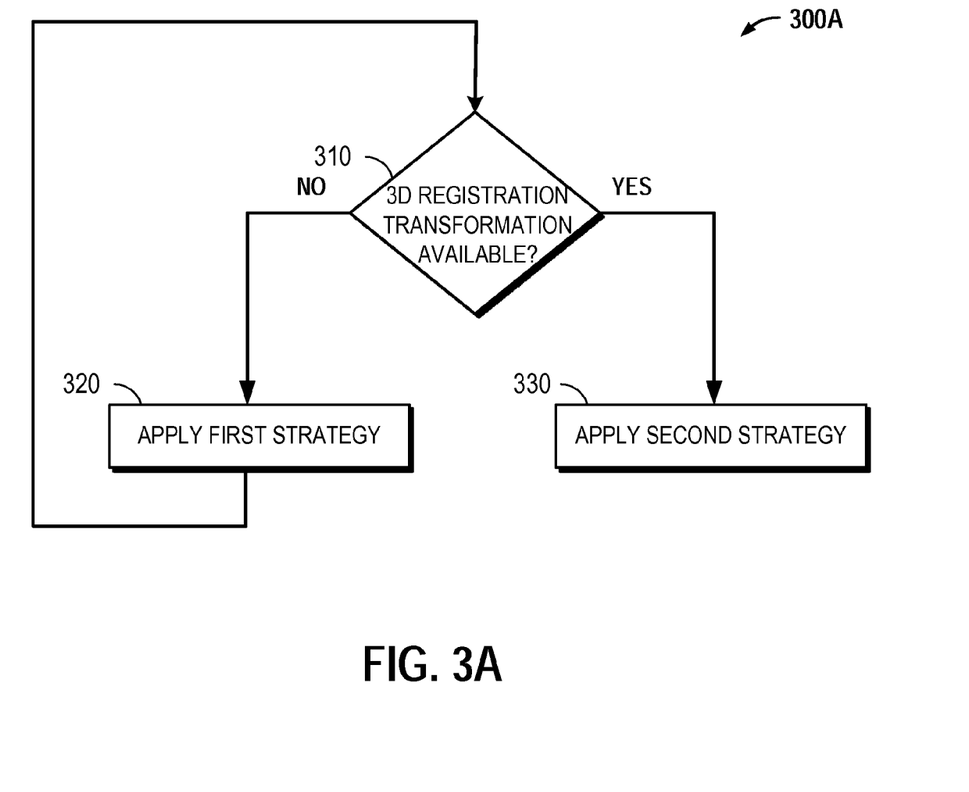
FIG. 3A is a flowchart illustrating an exemplary method for selecting a part of map information to be transmitted.

Referring to FIG. 3A, a flowchart illustrating an exemplary method 300A operable on device 210 for selecting a part of map information to be transmitted to device 220 is shown. At block 310, the device 210 may determine whether a 3D registration transformation between the map of the device 210 and the map of the device 220 is available by matching the map of the device 210 against the map of the device 220. If it is determines that a 3D registration transformation between the map of the device 210 and the map of the device 220 is not available because, for example, the device 210 or the device 220 have newly joined the collaborative SLAM operations, the method 300A proceeds to block 320. At block 320, a first strategy for selecting a part of map information to be transmitted to device 220 may be applied. Because a 3D registration transformation between the map of device 210 and the map of device 220 is not available, the priority is to establish the 3D registration transformation. In some embodiments, the first strategy may be to prioritize the newest incoming keyframe, i.e., to increase the probability that the newest incoming keyframe is to be transmitted to the device 220 next. The newest incoming keyframe may de denoted $K_n$, and the individual component of a likelihood function associated with the newest incoming keyframe may be denoted $l_n$. Thus, a likelihood function that reflects this strategy may be $L=\{l_i\}$, where $$l_i = \begin{cases} a, & \text{if } i = n \\ b, & \text{otherwise} \end{cases},$$

where a>b.

While exchanging map information according the first strategy, the device 210 may from time to time return to block 310 to reevaluate whether a 3D registration transformation between the map of the device 210 and the map of the device 220 is available by matching the map of the device 210 against the map of the device 220, in order to determine whether the second strategy, which will be described in detail below, may be utilized.

On the other hand, in response to a determination at block 310 that a 3D registration transformation between the map of device 210 and the map of device 220 is available, the method 300A proceeds to block 330, where a second strategy for selecting a part of map information to be transmitted to device 220 may be applied. Utilizing the 3D registration transformation, the second strategy may be to prioritize parts of the map of device 210 that correspond to scenes closest to the current pose of device 220 for transmission to the device 220, so that remapping the same scene at the device 220 may be avoided as much as possible. A likelihood function that reflects this strategy may be $l_i = e^{-dist(pose_c^i, K_i)^2}$, where dist (a, b) is defined as the distance between a and b, and $pose_c^i$ is the current or past pose of the device 220 closest to the keyframe $K_i$, which may be found using the formula $pose_c^i = \text{argmin}_{pose} \text{dist}(K_i, pose)$ (argmin stands for argument of the minimum).

An alternative second strategy may take into account the predicted movement of the device 220. Future poses of the device 220 may be estimated with, for example, dead-reckoning techniques. Then, instead of prioritizing keyframes corresponding to scenes closest to current or previous poses of the device 220, keyframes corresponding to scenes closest to estimated future poses of the device 220 may be prioritized according to this alternative second strategy.

In embodiments of the invention where the device 210 transmits map information to more than one client devices, such as an additional third device (not shown in FIG. 2), to implement a strategy, such as the first and second strategies described above, the device 210 may utilize separate transmission probability distributions for each of the other devices. Alternatively, the device 210 may utilize a combined transmission probability distribution for all of the other devices. In other words, the potential usefulness of the map information of the device 210 for different other devices is taken into account, and the device 210 may prioritize transmission of keyframes that are the most potentially useful for the collection of the other devices to the respective other devices.

Figure 3B:
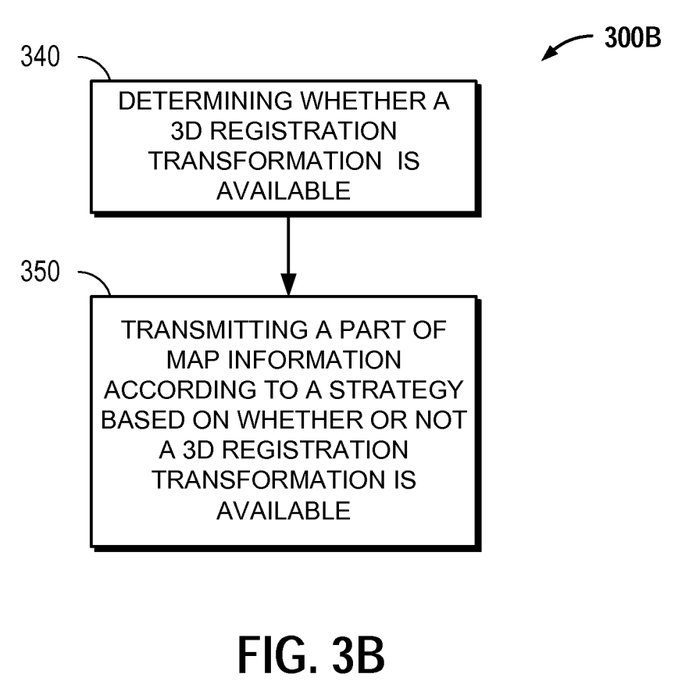
FIG. 3B is a flowchart illustrating an exemplary method for selecting a part of map information to be transmitted.

Referring to FIG. 3B, a flowchart illustrating an exemplary method 300B operable on device 210 for selecting a part of map information to be transmitted to device 220 is shown. At block 340, the device 210 may determine whether a 3D registration transformation between the map of the device 210 and the map of the device 220 is available by matching the map of the device 210 against the map of the device 220. Next, at block 350, the device 210 may transmit a part of its map information the second device 220 according to a strategy, where the strategy may be determined based on whether or not a 3D registration transformation between the map of the device 210 and the map of the device 220 is available. The strategy utilized at block 350 may be the first strategy, as described above, which leads to transmissions of all keyframes with equal probabilities, or the second strategy, also described above, which leads to transmissions to keyframes most likely to be useful to the device 220, given the past, present, and predicted poses of the device 220.

It has also been contemplated that the transmission probability distribution described above may be adapted to implement a transmission rate control mechanism. Using the transmission probability distribution to achieve transmission rate control may be implemented by adding a component into the transmission probability distribution that corresponds to the event that no data is to be transmitted next. Other components of the transmission probability distribution may be re-normalized proportionally so that the sum of all components in the transmission probability distribution remains to be 1. Therefore, it should be appreciated that the transmission rate of map data may be modified by modifying the component of the transmission probability distribution that corresponds to the no transmission event and re-normalizing the other components.

Therefore, by utilizing methods for selecting a part of map information to another device in a collaborative SLAM environment, as described herein, the exchange of map data between the devices may be optimized in that the most potentially useful map information is prioritized for transmission. In the process, different strategies may be applied depending on whether a 3D registration transformation is available between the device transmitting map information (such as the device 210 of FIG. 2) and the device receiving map information (such as the device 220 of FIG. 2).

It should be appreciated that the application for collaborative SLAM operations, as previously described, may be implemented as software, firmware, hardware, or any combinations thereof, etc. In one embodiment, the previous described functions may be implemented by one or more processors (such as processor(s) 110) of a device 100 to achieve the previously desired functions (such as the method operations of FIGS. 3A and 3B).

The teachings herein may be incorporated into (e.g., implemented within or performed by) a variety of apparatuses (e.g., devices). For example, one or more aspects taught herein may be incorporated into a general device, a desktop computer, a mobile computer, a mobile device, a phone (e.g., a cellular phone), a personal data assistant, a tablet, a laptop computer, a tablet, an entertainment device (e.g., a music or video device, etc.), a headset (e.g., headphones, an earpiece, etc.), a medical device (e.g., a biometric sensor, a heart rate monitor, a pedometer, an electrocardiography (EKG) device, etc.), a user I/O device, a computer, a server, a point-of-sale device, an entertainment device, a set-top box, a wearable device (e.g., watch, head mounted display, virtual reality glasses, etc.), an electronic device within an automobile, or any other suitable device.

In some aspects a wireless device may comprise an access device (e.g., a Wi-Fi access point) for a communication system. Such an access device may provide, for example, connectivity to another network through transceiver (e.g., a wide area network such as the Internet or a cellular network) via a wired or wireless communication link. Accordingly, the access device may enable another device (e.g., a Wi-Fi station) to access the other network or some other functionality. In addition, it should be appreciated that one or both of the devices may be portable or, in some cases, relatively non-portable.

It should be appreciated that when the devices are mobile or wireless devices that they may communicate via one or more wireless communication links through a wireless network that are based on or otherwise support any suitable wireless communication technology. For example, in some aspects the wireless device and other devices may associate with a network including a wireless network. In some aspects the network may comprise a body area network or a personal area network (e.g., an ultra-wideband network). In some aspects the network may comprise a local area network or a wide area network. A wireless device may support or otherwise use one or more of a variety of wireless communication technologies, protocols, or standards such as, for example, 3G, LTE, Advanced LTE, 4G, CDMA, TDMA, OFDM, OFDMA, WiMAX, and WiFi. Similarly, a wireless device may support or otherwise use one or more of a variety of corresponding modulation or multiplexing schemes. A wireless device may thus include appropriate components (e.g., air interfaces) to establish and communicate via one or more wireless communication links using the above or other wireless communication technologies. For example, a device may comprise a wireless transceiver with associated transmitter and receiver components (e.g., a transmitter and a receiver) that may include various components (e.g., signal generators and signal processors) that facilitate communication over a wireless medium. As is well known, a mobile wireless device may therefore wirelessly communicate with other mobile devices, cell phones, other wired and wireless computers, Internet web-sites, etc.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill in the art would further appreciate that the various illustrative logical blocks, modules, engines, circuits, and algorithm steps described in connection with the embodiments disclosed herein may be implemented as electronic hardware, computer software, or combinations of both. To clearly illustrate this interchangeability of hardware and software, various illustrative components, blocks, modules, engines, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in random-access memory (RAM), flash memory, read-only memory (ROM), erasable programmable read-only memory (EPROM), electrically erasable programmable read-only memory (EEPROM), registers, hard disk, a removable disk, a compact disc read-only memory (CD-ROM), or any other form of storage medium known in the art. An exemplary storage medium is coupled to the processor such the processor can read information from, and write information to, the storage medium. In the alternative, the storage medium may be integral to the processor. The processor and the storage medium may reside in an application-specific integrated circuit (ASIC). The ASIC may reside in a user terminal. In the alternative, the processor and the storage medium may reside as discrete components in a user terminal.

In one or more exemplary embodiments, the functions described may be implemented in hardware, software, firmware, or any combination thereof. If implemented in software as a computer program product, the functions or modules may be stored on or transmitted over as one or more instructions or code on a non-transitory computer-readable medium. Computer-readable media can include both computer storage media and communication media including any medium that facilitates transfer of a computer program from one place to another. A storage media may be any available media that can be accessed by a computer. By way of example, and not limitation, such non-transitory computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a web site, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of non-transitory computer-readable media.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method for selecting a part of simultaneous localization and mapping (SLAM) map information of a first device for transmission to a second device in a collaborative SLAM environment, comprising:
   determining whether a 3D registration transformation between a map of the first device and a map of the second device is available;
   in response to determining that a 3D registration transformation between the map of the first device and the map of the second device is not available, applying a first strategy for selecting a part of map information to be transmitted to the second device, wherein the first strategy prioritizes a newest incoming keyframe for transmission to the second device; and
   in response to determining that a 3D registration transformation between the map of the first device and the map of the second device is available, applying a second strategy for selecting a part of map information to be transmitted to the second device, the second strategy being different from the first strategy, wherein the second strategy prioritizes parts of the map information of the first device that correspond to scenes closest to current, previous, or predicted future poses of the second device for transmission to the second device.

2. The method of claim 1, wherein the transmission of map information is based on a transmission probability distribution, and applying either the first strategy or the second strategy comprises updating the transmission probability distribution with a Bayesian update step by multiplying the transmission probability distribution point-wise with a likelihood function.

3. The method of claim 2, wherein the first strategy is associate with a likelihood function $L=\{l_i\}$, where $$l_i = \begin{cases} a, & \text{if } i = n \\ b, & \text{otherwise} \end{cases},$$

and where a>b, and the second strategy is associated with a likelihood function $L=\{l_i\}$, where $l_i=e^{-dist(pose_c^i,K_i)^2}$ where $pose_c^i=\text{argmin}_{pose}\ dist(K_i,pose)$, and where $K_i$ is the i-th keyframe.

4. The method of claim 2, wherein a rate control mechanism is implemented with the transmission probability distribution.

5. The method of claim 1, wherein the SLAM map information of the first device is further transmitted to a third device based on a combined transmission probability distribution, and wherein the combined transmission probability distribution controls the transmissions of map information to both the second and the third devices.

6. A first device apparatus for selecting a part of simultaneous localization and mapping (SLAM) map information of the first device for transmission to a second device in a collaborative SLAM environment, comprising:
   a memory; and
   a processor to:
   determine whether a 3D registration transformation between a map of the first device and a map of the second device is available,
   in response to determining that a 3D registration transformation between a map of the first device and a map of the second device is not available, apply a first strategy for selecting a part of map information to be transmitted to the second device, wherein the first strategy prioritizes a newest incoming keyframe for transmission to the second device, and
   in response to determining that a 3D registration transformation between a map of the first device and a map of the second device is available, apply a second strategy for selecting a part of map information to be transmitted to the second device, the second strategy being different from the first strategy, wherein the second strategy prioritizes parts of the map information of the first device that correspond to scenes closest to current, previous, or predicted future poses of the second device for transmission to the second device.

7. The apparatus of claim 6, wherein the transmission of map information is based on a transmission probability distribution, and the processor configured to apply either the first strategy or the second strategy is further configured to update the transmission probability distribution with a Bayesian update step by multiplying the transmission probability distribution point-wise with a likelihood function.

8. The apparatus of claim 7, wherein the first strategy is associate with a likelihood function $L=\{l_i\}$, where $$l_i = \begin{cases} a, & \text{if } i = n \\ b, & \text{otherwise} \end{cases},$$

and where a>b, and then second strategy is associated with a likelihood function $L=\{l_i\}$, where $l_i=e^{-dist(pose_c^i,K_i)^2}$, where $pose_c^i=\text{argmin}_{pose}\ dist(K_i,pose)$, and where $K_i$ is the i-th keyframe.

9. The apparatus of claim 7, wherein a rate control mechanism is implemented with the transmission probability distribution.

10. The apparatus of claim 6, wherein the SLAM map information of the first device is further transmitted to a third device based on a combined transmission probability distribution, and wherein the combined transmission probability distribution controls the transmissions of map information to both the second and the third devices.

11. A first device apparatus for selecting a part of simultaneous localization and mapping (SLAM) map information of the first device for transmission to a second device in a collaborative SLAM environment, comprising:
   means for determining whether a 3D registration transformation between a map of the first device and a map of the second device is available;
   means for applying a first strategy for selecting a part of map information to be transmitted to the second device when a 3D registration transformation between the map of the first device and the map of the second device is not available, wherein the first strategy prioritizes a newest incoming keyframe for transmission to the second device; and
   means for applying a second strategy for selecting a part of map information to be transmitted to the second device when a 3D registration transformation between the map of the first device and the map of the second device is available, the second strategy being different from the first strategy, wherein the second strategy prioritizes parts of the map information of the first device that correspond to scenes closest to current, previous, or predicted future poses of the second device for transmission to the second device.

12. The apparatus of claim 11, wherein the transmission of map information is based on a transmission probability distribution, and means for applying either the first strategy or the second strategy comprises means for updating the transmission probability distribution with a Bayesian update step by multiplying the transmission probability distribution point-wise with a likelihood function.

13. The apparatus of claim 12, wherein the first strategy is associate with a likelihood function $L=\{l_i\}$, where $$l_i = \begin{cases} a, & \text{if } i = n \\ b, & \text{otherwise} \end{cases},$$

and where a>b, and the second strategy is associated with a likelihood function $L=\{l_i\}$, where $l_i = e^{-dist(pose_c^i, K_i)^2}$, where $pose_c^i = \text{argmin}_{pose} \text{ dist}(K_i, pose)$, and where $K_i$ is the i-th keyframe.

14. The apparatus of claim 12, wherein a rate control mechanism is implemented with the transmission probability distribution.

15. The apparatus of claim 11, wherein the SLAM map information of the first device is further transmitted to a third device based on a combined transmission probability distribution, wherein the combined transmission probability distribution controls the transmissions of map information to both the second and the third devices.

16. A non-transitory computer-readable medium including code which, when executed by a processor in a first device, causes the processor to perform a method comprising:
   determining whether a 3D registration transformation between a map of the first device and a map of a second device is available; and
   transmit a part of map information of the first device to the second device according to one of a first strategy or a second strategy based on whether or not a 3D registration transformation between the map of the first device and the map of the second device is available, the second strategy being different from the first strategy, wherein the first strategy prioritizes a newest incoming keyframe for transmission to the second device, and the second strategy prioritizes parts of the map information of the first device that correspond to scenes closest to current, previous, or predicted future poses of the second device for transmission to the second device.

17. The non-transitory computer-readable medium of claim 16, wherein the transmission of map information is based on a transmission probability distribution, and the method further comprising updating the transmission probability distribution with a Bayesian update step by multiplying the transmission probability distribution point-wise with a likelihood function.

18. The non-transitory computer-readable medium of claim 17, wherein the first strategy is associate with a likelihood function $L=\{l_i\}$, where $$l_i = \begin{cases} a, & \text{if } i = n \\ b, & \text{otherwise} \end{cases},$$

and where a>b, and the second strategy is associated with a likelihood function $L=\{l_i\}$, where $l_i = e^{-dist(pose_c^i, K_i)^2}$, where $pose_c^i = \text{argmin}_{pose} \text{ dist}(K_i, pose)$, and where $K_i$ is the i-th keyframe.

19. The non-transitory computer-readable medium of claim 17, wherein a rate control mechanism is implemented with the transmission probability distribution.

20. The non-transitory computer-readable medium of claim 16, wherein simultaneous localization and mapping (SLAM) map information of the first device is further transmitted to a third device based on a combined transmission probability distribution, and wherein the combined transmission probability distribution controls the transmissions of map information to both the second and the third devices.

* * * * *